Patented Feb. 4, 1930

1,745,397

UNITED STATES PATENT OFFICE

HERMANN BACH, OF ESSEN, GERMANY

PROCESS OF BIOLOGICAL PURIFICATION OF WASTE LIQUORS FROM GAS WORKS, AMMONIA-RECOVERY PLANTS, TAR FACTORIES, AND SIMILAR INDUSTRIES

No Drawing. Application filed December 2, 1925, Serial No. 72,838, and in Germany December 10, 1924.

My invention relates to the treatment of waste-liquors from gasworks, ammonia recovery plants, tar factories, and similar industries, by means of biological action whereby the liquors become purified, while especially the water-soluble phenols therein are destroyed, as first shown by G. J. Fowler (see G. J. Fowler and A. L. Holton: "Experiments on the bacterial purification of ammonia recovery liquor at the gasworks of the Manchester Corporation", Journ. Soc. Chem. Ind. 1911, p. 180), while I employ an improved and more effective method to this end.

My invention relates to the treatment of waste-liquors with the aid of contact bodies inoculated with bacteria, the said contact bodies being aggregates of suitable material such as stone, slags, or the like, which are aerated by means of air blown through perforated pipes or other devices placed below said bodies immersed in the waste-liquors to be purified.

The novel feature of my invention is the optional prolongation and increasing of the biological action of ripened medium attained by immersion of the artificially aerated biological body in the waste-liquor to be purified, with the effect of oxidizing the impurities therein and especially the organic compounds of such a stability as the phenols are.

In order to treat the waste-liquors to be purified, the artificially aerated contact body is inoculated and ripened in the well-known way with domestic sewage, cow dung, soil extracts, or the like. The waste-liquors to be treated may be diluted by water, or by already purified effluent from the same purification plant, or by sewage.

During the treatment whose extension depends upon the degree of contamination of the waste-liquors, the latter become purified and especially the water-soluble phenols therein become destroyed by the biological action, so that the effluent from the purification plant is in fact free of phenols or contains trifling rests thereof only. The process can be carried out continuously or intermittently and is of markedly higher efficiency than the old trickling filter method.

As it has already been proposed to improve the action of trickling filters by the use of artificial aeration, it may be useful to explain the essential difference between said known art and my improved process.

Trickling filters consist of a freely located heap of biological ripened medium, on which the liquor to be purified is distributed. The liquor drops through the heap, its detention period, that is, the duration of the biological action thereon depending thus only upon the gravity of the liquor and the frictional surface resistance of the ripened medium, any optional influence upon said detention period being impossible. The action of trickling filters with or without artificial aeration is thus limited to the said uncontrolled detention period of the dropping liquid therein. Therefore, the liquor to be purified can not be treated, that is, brought into intimate contact with the bacteria, for such a long time as is required for a reliable purification of a strongly polluted liquor.

On the contrary thereto, in my improved process the liquid does not drop by its gravity through the filter, but it flows therethrough filling-in all available spaces of the biological body, while the speed of flow and consequently the detention period, that is, the duration of biological action thereon, can be exactly controlled, because it depends in this case chiefly upon the head of the incoming stream of liquor, which can be adjusted at will by the well-known ordinary means. At the same time, the action of the bacteria can be increased according to requirements, because the air blown through the contact body immersed in the liquor to be purified, must pass through the biological medium from the bottom to the top, there being no other way for its escape. The means for attaining these important advantages is, the immersion of the biological body in the waste-liquor to be purified and its artificial aeration from below, this being the object of my invention. Thereby, the biological purification can be enhanced to such an efficiency that even such resistant compounds as phenols can be removed in an economical way by biological action.

Thus, the improved process renders it feasible to purify waste-liquors from gas works or the like, and especially to remove therefrom the water-soluble phenols, in those frequent instances where sufficient space for locating biological filters of conventional type is not available.

What I claim, is:—

In a biological purification of waste-liquors, especially such contaminated with phenols, with the aid of artificially aerated contact bodies, immersing the contact body in the waste-liquor to be purified, artificially aerating said body by means of air blown therethrough from below the same, and passing the waste-liquor through said immersed contact body and controlling its detention period therein.

In testimony whereof I have hereunto set my hand.

HERMANN BACH.